(12) United States Patent
Kwon et al.

(10) Patent No.: US 7,130,649 B2
(45) Date of Patent: Oct. 31, 2006

(54) MESSAGE CREATING APPARATUS AND METHOD FOR MOBILE PHONE

(75) Inventors: Hyuk Kwon, Seongnam (KR); Jae-Yeong Lee, Ansan (KR)

(73) Assignee: Mbridge Systems, INC, Seoul (KR)

( * ) Notice: Subject to any disclaimer, the term of this patent is extended or adjusted under 35 U.S.C. 154(b) by 43 days.

(21) Appl. No.: 10/472,294

(22) PCT Filed: Oct. 7, 2002

(86) PCT No.: PCT/KR02/01867

§ 371 (c)(1),
(2), (4) Date: Sep. 22, 2003

(87) PCT Pub. No.: WO03/039018

PCT Pub. Date: May 8, 2003

(65) Prior Publication Data

US 2004/0171392 A1   Sep. 2, 2004

(30) Foreign Application Priority Data

Oct. 8, 2001 (KR) ............................ 2001-61749
Sep. 2, 2002 (KR) ............................ 2002-52445

(51) Int. Cl.
*H04Q 7/20* (2006.01)

(52) U.S. Cl. ............... 455/466; 455/412.2; 455/413; 455/407; 455/456.6; 455/458; 455/556.2; 709/204; 709/236; 709/203; 709/217; 379/220.01; 379/201.04; 379/142.17; 379/93.17; 701/207; 715/517; 715/526; 715/531; 715/839

(58) Field of Classification Search ........... 455/466, 455/412.2, 413, 407, 456.6, 458, 556.2; 345/169; 701/207; 715/517, 526, 531; 379/142.17, 379/201.4, 220.01; 709/204, 236
See application file for complete search history.

(56) References Cited

U.S. PATENT DOCUMENTS

| | | | |
|---|---|---|---|
| 6,115,023 A | 9/2000 | Uchida | |
| 6,151,507 A * | 11/2000 | Laiho et al. | 455/466 |
| 6,675,204 B1 * | 1/2004 | De Boor et al. | 709/217 |
| 6,714,222 B1 * | 3/2004 | Bjorn et al. | 715/839 |
| 6,714,802 B1 * | 3/2004 | Barvesten | 455/575.1 |
| 6,724,370 B1 * | 4/2004 | Dutta et al. | 345/169 |
| 6,779,178 B1 * | 8/2004 | Lloyd et al. | 717/174 |
| 2002/0004702 A1 * | 1/2002 | Ruhl | 701/207 |
| 2002/0078143 A1 * | 6/2002 | De Boor et al. | 709/203 |
| 2002/0172345 A1 * | 11/2002 | Wu | 379/220.01 |
| 2004/0039779 A1 * | 2/2004 | Amstrong et al. | 709/204 |
| 2005/0027802 A1 * | 2/2005 | Madsen et al. | 709/204 |

FOREIGN PATENT DOCUMENTS

| | | |
|---|---|---|
| JP | 2001-268185 | 9/2001 |
| KR | 2000-50644 | 8/2000 |
| KR | 2001-26576 | 4/2001 |

* cited by examiner

*Primary Examiner*—Joseph Feild
*Assistant Examiner*—David Nguyen
(74) *Attorney, Agent, or Firm*—Dilworth & Barrese LLP (57) ABSTRACT

This invention is a message crating apparatus and message writing method for mobile phone. The above message (SMS or LMS) of mobile phone is including an attribute information(letter color, background color, background scene, letter blink, etc.). Therefore, message creating apparatus and message writing method of the present invention add an attribute information that can select freely that letter color, background color, background scene, letter blink, etc., and use non-print code of ASCII code to keep compatibility with a short message service (SMS) function of existing mobile phone.

9 Claims, 9 Drawing Sheets

| 28 | 29 | 30 |
|---|---|---|
| Character color | Background color | Blink |
| color 1 | color 1 | Mode 1 |
| color 2 | color 2 | Mode 2 |
| color 3 | color 3 | Mode 3 |
| color 4 | color 4 | Mode 4 |
| . | . | . |
| . | . | . |
| . | . | . |
| . | . | . |
| color N | color N | Mode K |

1BYTE

5bits

FIG. 6b

Attribute 1   Attribute 2   Attribute 3   Attribute 4   Attribute 5

MESSAGE CREATING APPARATUS AND METHOD FOR MOBILE PHONE

TECHNICAL FIELD

The present invention relates to text message service system for the mobile phone display, and more particularly, to a system and a method for creating text message wherein particular colors for the characters or letters and the background on the mobile phone display may be selected and characters may be made to blink.

BACKGROUND ART

Text message services [short message service(SMS) and long message service(LMS)] are now prevalent for mobile phones. The text message services such as SMS and LMS refer to services providing combinations of characters and numerals made out by the users of mobile phones, internet and personal computer communication, or various information prepared by service providers through mobile phone communication system. These message services are effectively used in financial businesses such as notification of balance changes, particulars of deposit and drawing, arrear information and new services; businesses such as communications among staffs, order/distribution information, event notice, customer management, employee calling; government and public affairs such as taxation advice, training advice, event notice; electronic commerce, auction and community activity, etc. In addition, recently SMS businesses are carried out through Internet Network or business private lines by SMS gateways or ASP service providers.

Figure 1:
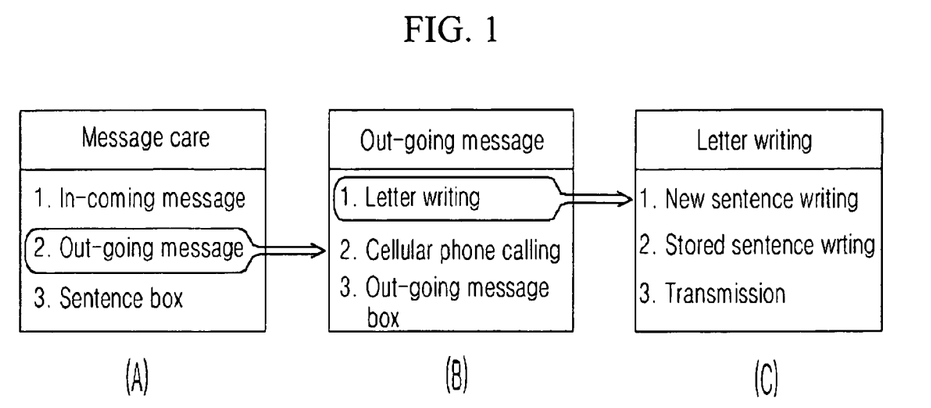
FIG. 1 is a block diagram of UI(User Interface) showing the conventional method for writing text messages.

Messages are generally transmitted by means of mobile phones in the same manner as shown in the FIG. 1. When a user accesses a message care menu as shown in the (A), out-going message menu appears, and when he selects it, the menues of letter writing, mobile phone calling, out-going message box arrangement appear as shown in the (B), and menues such as writing of new sentences, calling of stored sentences and transmission appear. When the user writes and transmits a message by using a keypad, the message is received by a mobile phone of a recipient via the message system.

But, as the text message of the conventional mobile phone is made in monochrome and does not have the function of character blink, it could not grab the user's interest, especially the young user's.

DISCLOSURE OF INVENTION

An object of the present-invention is to provide a system for creating text message on mobile phone display with a message creating part which has an additional part for creating message attributes of character or letter colors, background colors and blink.

Another object of the present invention is to provide a method for writing a text message having character and attribute information.

According to the present invention as described above, a system for creating text message on mobile phone display, wherein attribute information(character colors, background colors and blink) are added to the message, comprises a means for creating a first message signal by combining character codes which are outputted from a character input means by a user and then inputted thereinto; a means for selecting a character color to output the corresponding character color attribute value selected among a plurality of color values by the user; a means for selecting a background color to output the corresponding background attribute value selected among a plurality of color values by the user; a means for selecting a blink mode to output the corresponding blink attribute value selected among a plurality of blink modes by the user; a means for creating a second message signal by combining each of the attribute values outputted from the selecting means for character color, background color and blink function; and a means for transmitting the first and the second message signals.

Preferably the first message signal comprises a header part including ID or specific number and a message data part comprising ASCII values, and the second message signal comprises a header part including ID or specific number and an attribute information part of character color, background color and blink.

With regard to transmitting the first and the second message signals through the transmitting means, it is possible to transmit the second message signal followed by the first message signal or to transmit the first and second message signal at the same time.

In addition, the blink modes to be selected by the blink selecting means preferably comprises a non-blink mode, a mode for blinking in an odd number of the characters and a mode for blinking in an even number of the letters.

Further, the background color selecting means preferably includes a background scene selecting means which allows a user to select one among a plurality of background scene indexes stored in a memory thereby outputting a background scene attribute value for the selected background scene.

Meanwhile, in accordance with the present invention, a method for writing text message which comprises attribute information(character colors, background colors and blink) on mobile phone display will now be described. Especially, the method of the present invention is made to be compatible with the conventional SMS in consideration of characteristics of mobile phone display such as portable telephones.

ASCII codes are used as standard character notation forms in information technology industry including codes which do not appear on the screen, but are used for control. These codes are referred to as non-printable codes or non-printable characters and the non-printable codes cover the regions from 0x01 to 0x1F. These codes are used for control thereby carrying out their functions in personal computers but do have nothing to do in portable phones. Therefore, when the non-printable codes are transmitted to a portable phone, they do not function to show something on a screen and moreover no action occurs. Accordingly, the system of the present invention has an advantage that it is compatible with the conventional SMS system by using the non-printable codes transmitting attribute information of colors, background scenes and blink, etc.

According to the present invention, the method for writing text message comprises the steps of forming text message information in accordance with the character string inputted by a user; inserting an identifier indicating the start of attribute information followed by the character string; inserting attribute values(character blink and character color value) which are selected in the region of non-printable codes among ASCII codes.

The above method may further comprise the step of inserting an index value which selects one among a plurality of background scenes in addition to the message information.

Further, the attribute values are characterized in that they are assigned to the rest 5 bits exclusive of the upper of 3 bits from 1 byte data row, while the character blink value among the attribute values may be 1 bit and the character color value may be 2 bits.

BEST MODES FOR CARRYING OUT THE INVENTION

Hereinafter, preferable embodiments according to the present invention will be described in detail with reference to the accompanying drawings.

Message Creating System

Figure 2A:
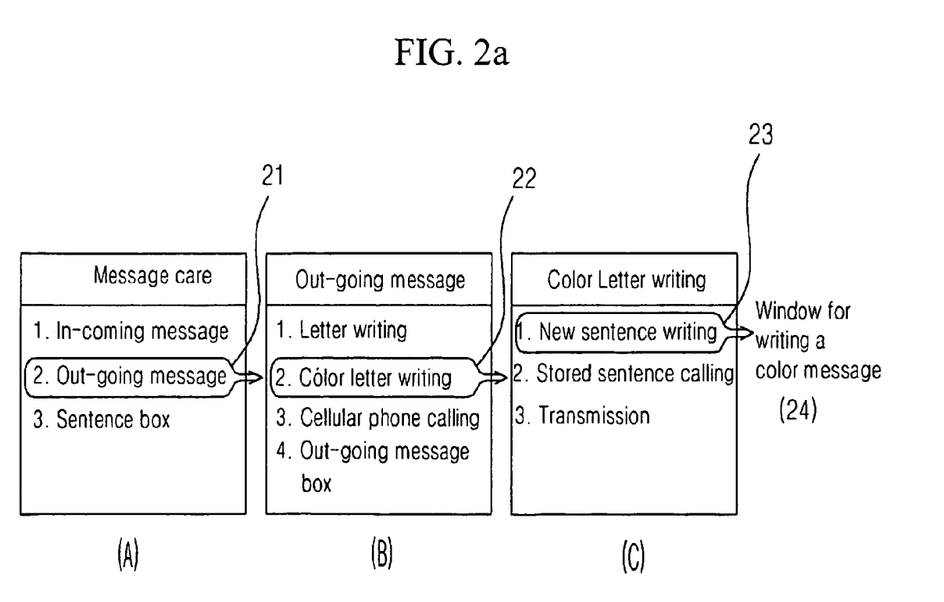
FIGS. 2a to 2e are block diagrams showing the processes of writing text messages according to the present invention.

FIG. 2a illustrates in detail an embodiment of the present invention by means of a user interface, wherein (a) when a user selects the outgoing message 21 in the main menu window as usual, (b) the menu for writing a color letter 22 appears apart from the menu for writing a letter, (c) and then when the user selects the menu for writing a color letter 22 and the menu for writing a new sentence 23, the window for writing a color message comes out.

Figure 2B:
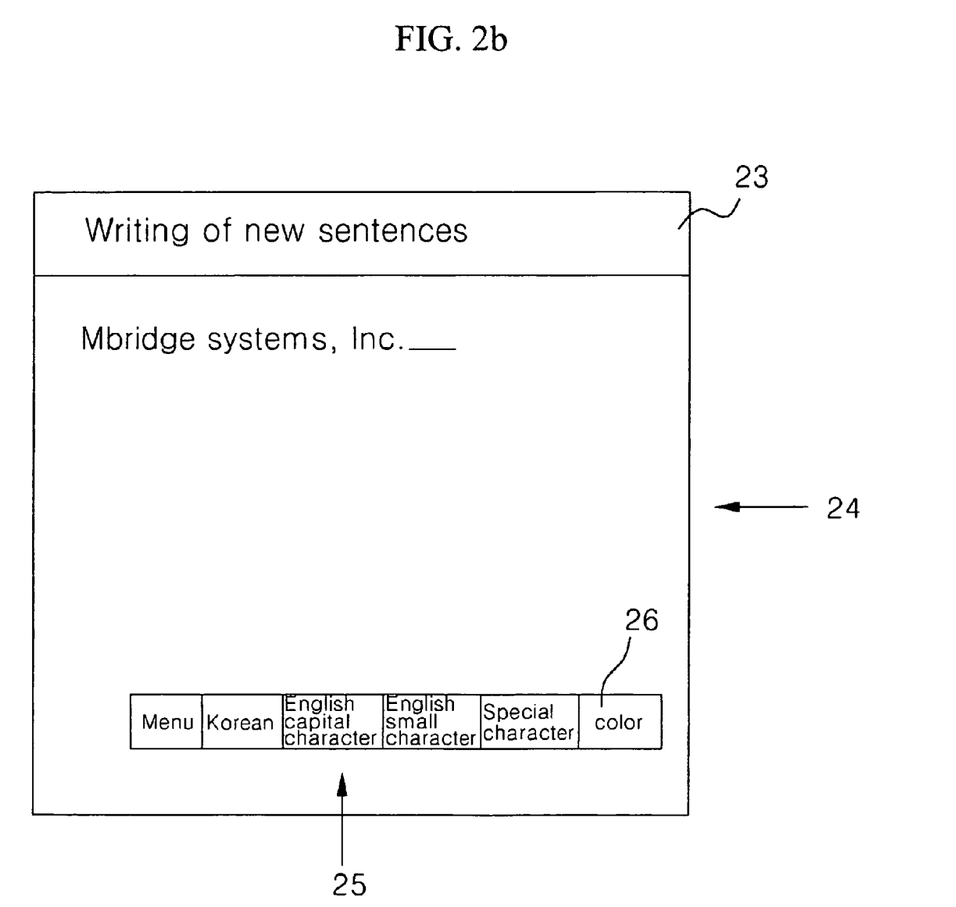
Figure 2C:
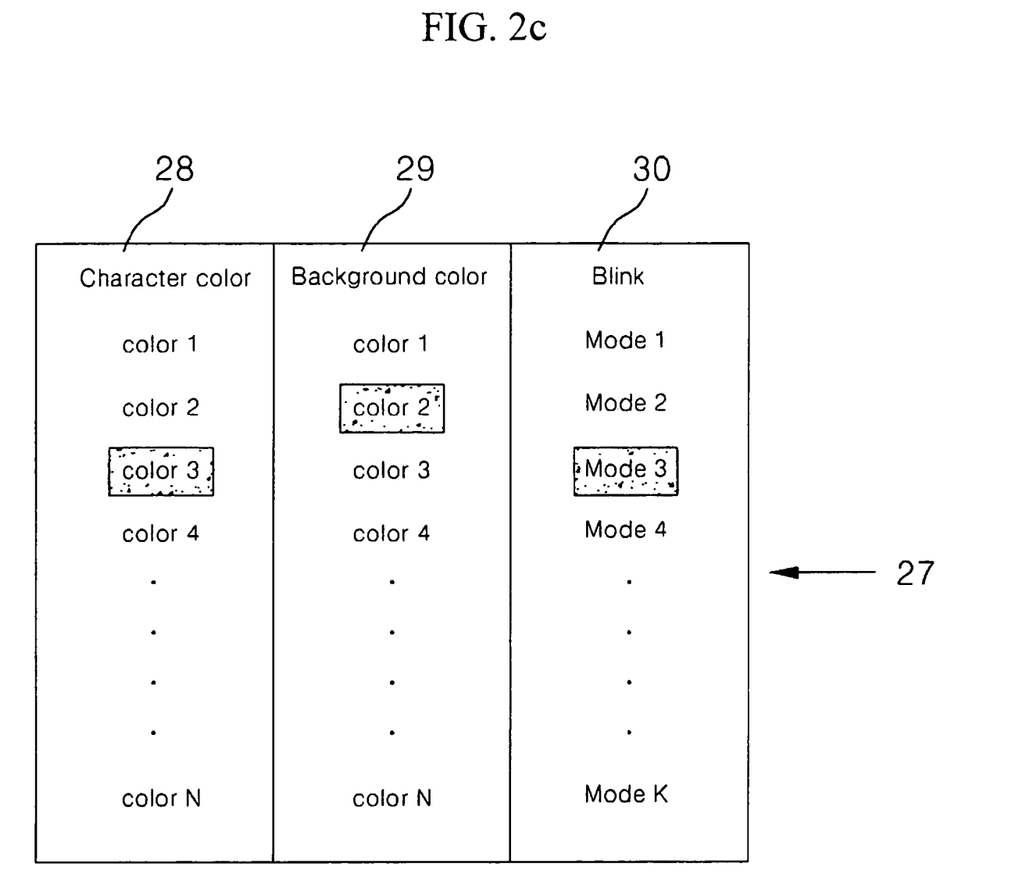

FIG. 2b is a view of an example of a window for writing color message 24 and shows that the message of "MBridge Systems, Inc." is being written. There is a menu bar 25 at the bottom of the window 24 for writing a color message, which includes a "color" menu 26 as well as the conventional menues such as Korean-English conversion, capital character-small character conversion, special characters, etc. When the "color" menu 26 is selected on the menu bar 25, the window 27 for selecting colors as shown in FIG. 2c appears.

In the window 27 for selecting colors, a color may be selected from color 1 to color N for character color 28 and background color 29, respectively and a mode can be selected from mode 1 to mode K for character blink 30 (hereinafter, referred to as "blink"). The blink modes can be varied as the designer pleases. For instance, a non-blink mode, a mode for blinking in an odd number line, a mode for blinking in an even number line and variation of blink rate, etc. can be determined by the designer.

Figure 2D:
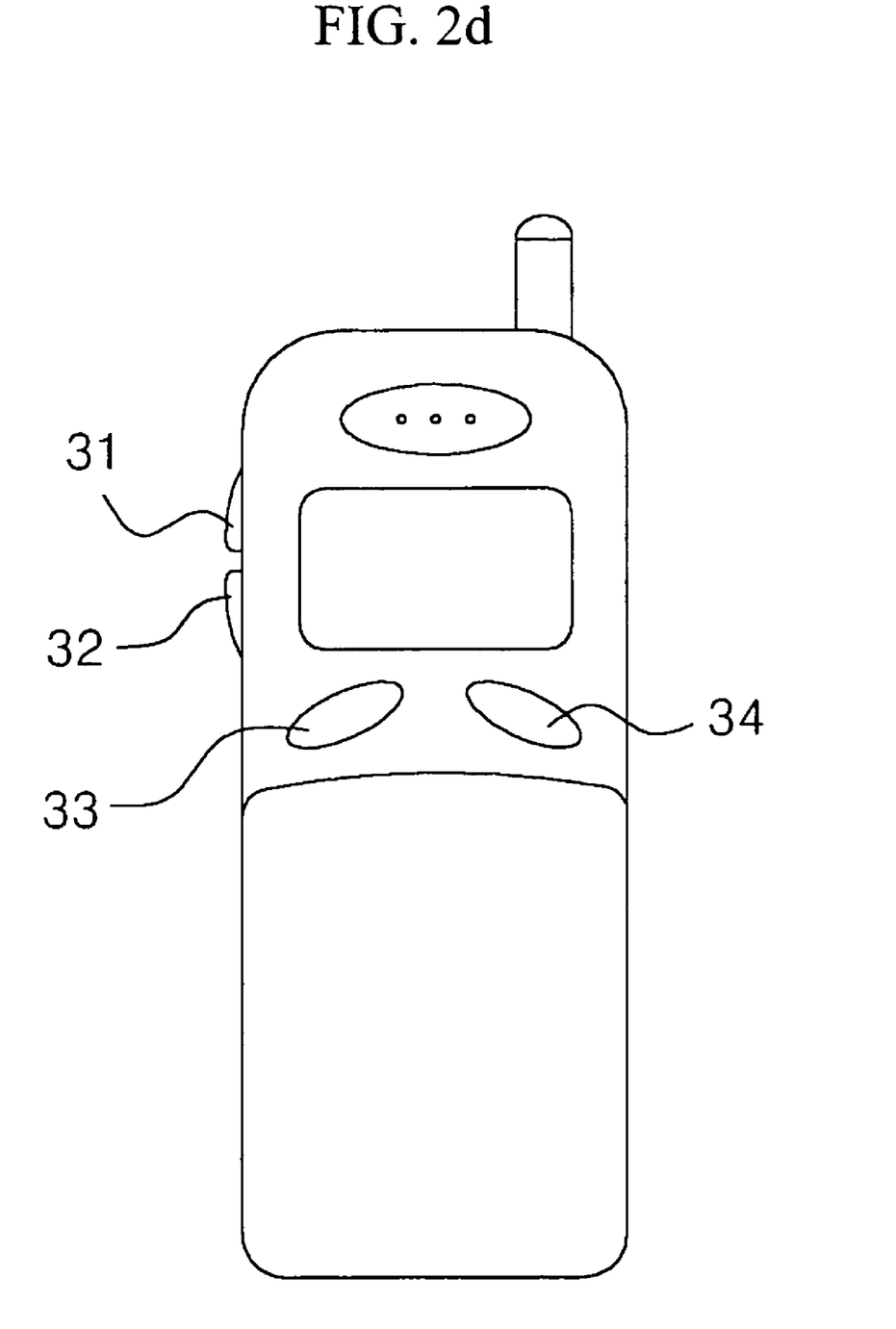
Figure 2E:
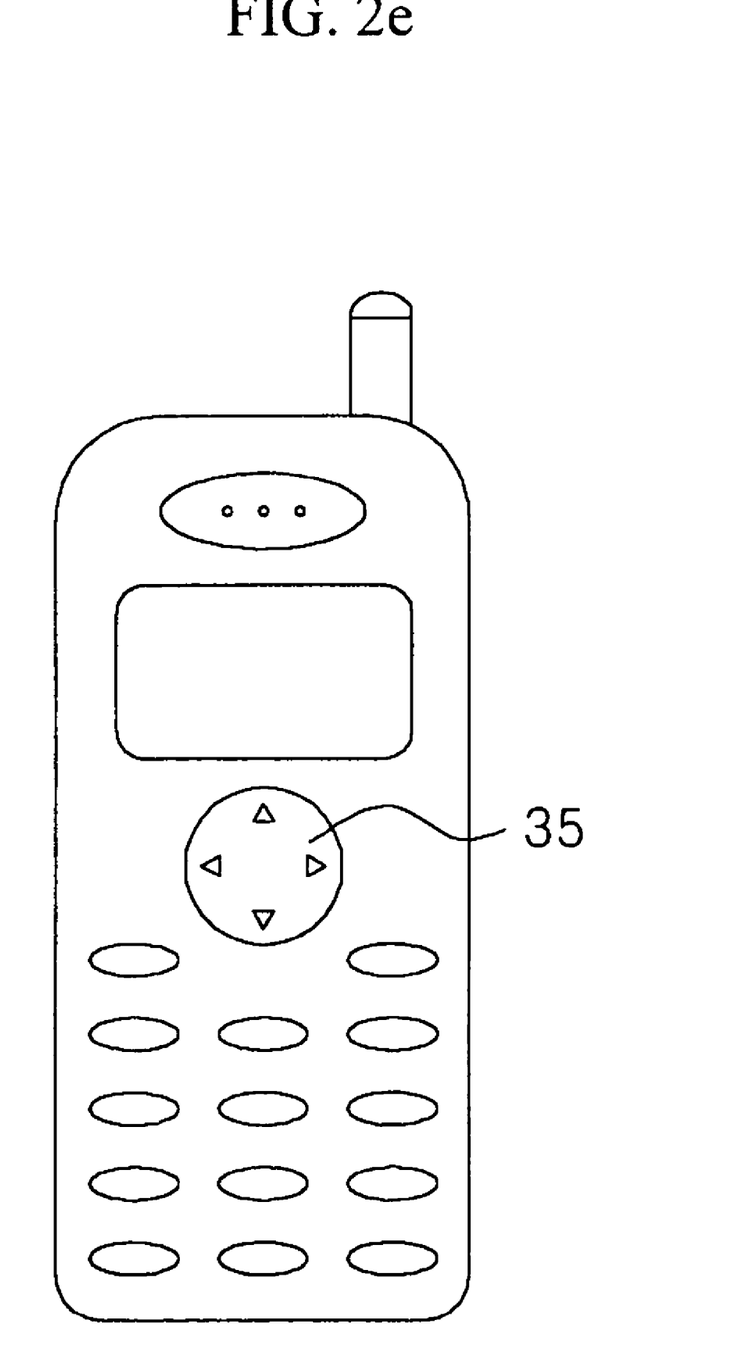

Selection of character color 28, background color 29 and blink 30 is executed by using an optional key installed in the phone. For instance, for selecting character color 28 and background color 29, a scroll button on a side of the phone may be designed to scroll from color 1 to color N in order to have a upper button 31 and a lower button 32 select character color and background color, respectively. Further, blink mode selection 30 is executed by using left-right shifting buttons 33 and 34 on the keypad of the phone, as shown in FIG. 2d. But, the selecting means are not limited to those buttons. It would be obvious to those skilled in art that other keys in addition to the scroll buttons 31 and 32 may be used for such use. Meanwhile, a phone with a up-down-left-right cursor key 35 as shown in the FIG. 2e may operate the window 27 for selecting colors by using those keys.

Figure 3:
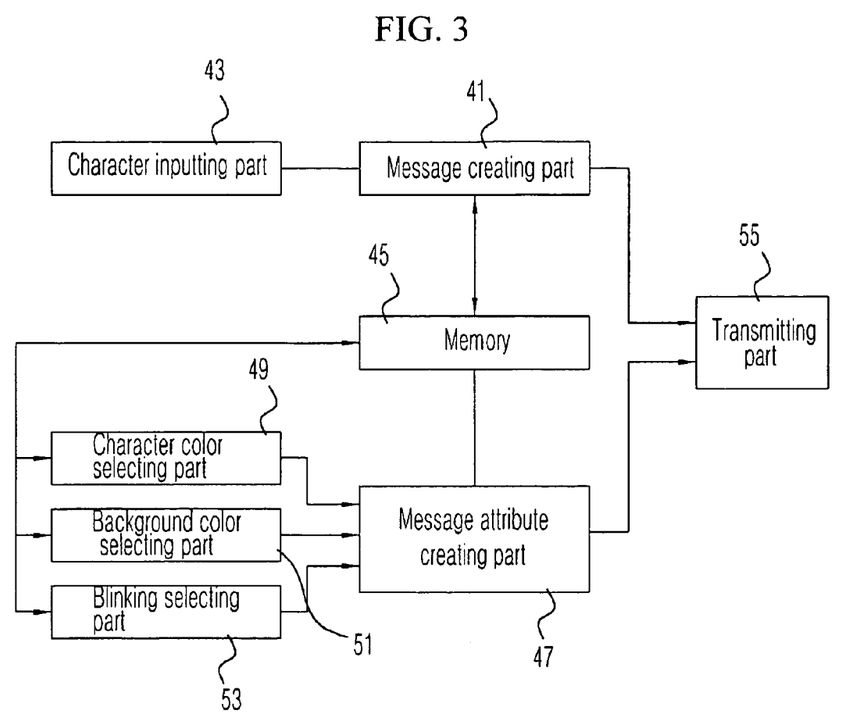
FIG. 3 is a block diagram of a system for creating text messages according to the present invention.
Figure 4A:
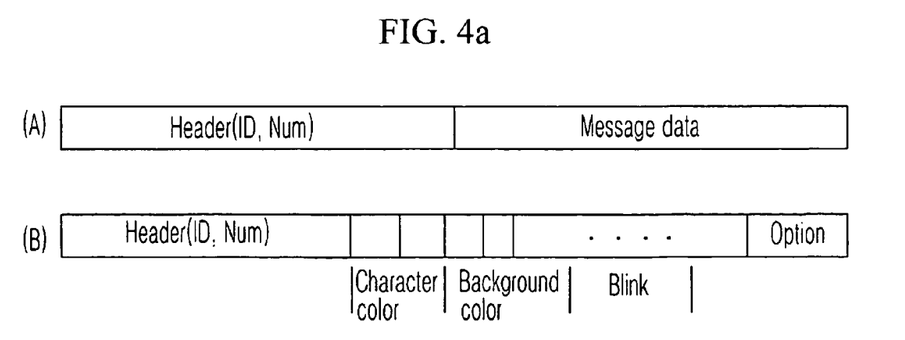
FIGS. 4a to 4d are block diagrams of the text message data according to the present invention.
Figure 4B:
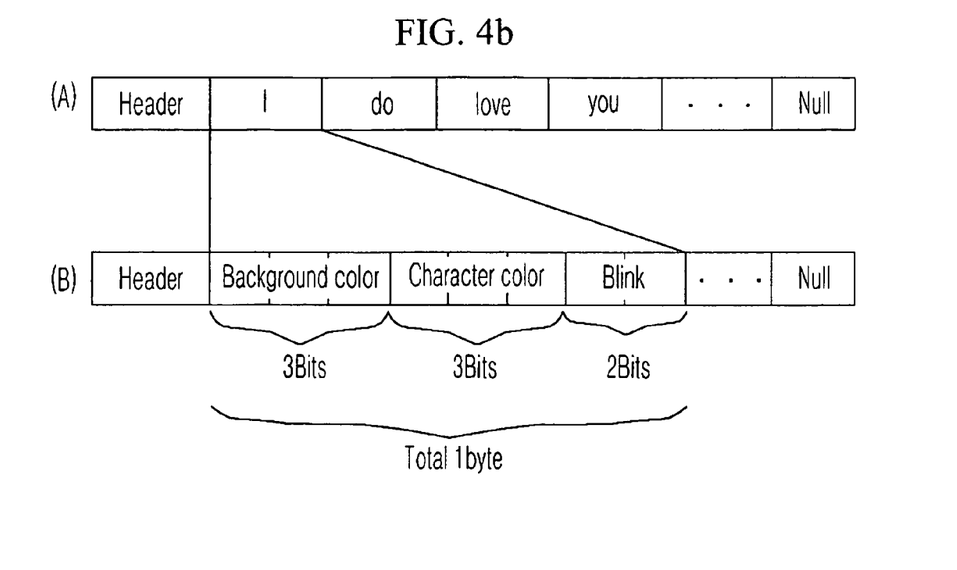

The FIG. 3 shows a block diagram of an embodiment of message creating system according to the present invention and FIGS. 4a and 4b show the text message data format according to the present invention, In the FIG. 3, a message creating part 41, a character inputting part 43 and a memory 45 are components included in the conventional message systems. The message creating system of the present invention further comprises a message attribute creating part 47, a character color selecting part 49, a background color selecting part 51, a blink selecting part 53 and a transmitting part 55.

The memory 45 stores basic data for creating text message and message attributes(character colors, background colors and blink).

The message creating part 41 creates a first message by combining the character codes inputted from the character inputting part 43 with reference to the memory 45. The first message signal is created by the same operation as the common SMS system and comprises ASCII values. The (A) in the FIG. 4a shows a data format of the first message signal. It should be noted that the data comprises a header field including an ID and a specific number(Num), and a message data field comprising ASCII values.

The message attribute creating part 47 creates a second message signal by combining the attribute data which comprise the attribute values selected from the blink selecting part 53 and inputted thereto with reference to the memory 45. The attribute data may be created by assigning a specific code for the respective attributes(character color, background color and blink) and an ID for the respective colors, respectively. The blink mode is designed to have a plurality of modes previously and stored in the memory 45. The (B) in the FIG. 4a shows a data format of the second message signal. The ID or the specific number(Num) of the second message signal should be identical with that of the header of the first message signal.

Hereinafter, an example of a method for creating information of the first and the second message signal will be described in detail with reference to the FIG. 4b. In the FIG. 4b, the sentence of "I do love you" is given as an example of text message. For instance, a background color and a character color may be selected among 8 (eight) colors, respectively, and the blink function may be selected from 3 modes(non-blink, blinking in an odd number and blinking in an even number). The system of the present invention needs additional information for character color, background color and blink, while the conventional SMS does not need such information as it has only one kind of background color and character color, respectively, and therefore the first message signal, namely the (A) in the FIG. 4b is identical with the conventional SMS message signal. That is, the information data size needed in the present invention corresponds to the respective message signal, while the data size needed in the conventional message signal is 2 byte for a Korean character and 1 byte for an English alphabet and ASCII code, respectively. The FIG. 4b shows that for the one English alphabet of "I" in the (B), namely the second message signal, assigned further are 3 bits for the background color, 3 bits for the character color and 2 bits for blink(accordingly, the total 1 byte). As one English alphabet needs one byte for the second message signal, it requires one byte, and one Korean or other special character needs 2 bytes and therefore the second message signal for it also needs 2 bytes, which made by repeating twice 1 byte of the same content. In conclusion, each character corresponds to the second message information of the same size each other. Further, as the background and character colors are possible to covers 8 kinds of colors, respectively, it needs 3 bits per each one. But, as the background color does not need to apply to the data after the first data, it is only needed to be included in the upper 3 bits of the first 1 byte. As the blink has 3 kinds of modes, it needs 2 bits per each one.

With reference to the FIG. 3 again, the transmitting part 55 has the function of transmitting the first and the second message signals and especially in the present invention, it transmits separately each of the first and the second message signals stored in the memory 45 twice in the same way as the multiple-destination transmission. That is to say, the first message signal is transmitted first as a pure text data and then the second message signal is transmitted as an information data corresponding to the text. In this case, when they were transmitted by a conventional method, they should be transmitted twice separately and therefore they should have the same destination address.

Meanwhile, in the case of the SMS used in the CDMA environment, a subscriber to "SK Telecom" adopting the cellular communication system transmits his message by using the area of 80 bytes, and a subscriber to "KTF" or "LG Telecom" with the PCS system uses the area of 90 bytes, respectively. Accordingly, the bigger user's area is needed to transmit attribute values for background scene and characters in company with the character string and therefore the first and the second message signals should be transmitted twice separately. But, when radio network providers have built a system for transmitting a large amount of message, such as the LMS(Long Message Service), all the information of the message may be transmitted at once but not twice separately. In addition, one message including both of the character message signal and the message attributes, can be created.

Hereinafter, operation of the reception will be described. The receiving part of the other party's phone receives the first message signals and stores them in the same manner as the conventional SMS and then displays the stored data, wherein as it does not have any information data for the second message signal, the message signals are displayed in the same way as the conventional SMS. With regard to the second message signals received later, they keep the address for the end part of the data area of the first message signals. Once the second message signals are received, all the header information in the second message signals is cut off and only the pure message attribute information is stored after the end of the address stored previously. When the second message signals are completely stored, the ends of the first message signals are checked. If the message attribute information was checked to be stored therein, the text message and attribute data are combined and the message having the character color, background color and blink is displayed on the phone display according to the present invention.

Aforementioned embodiment is not intended to limit the teaching of the present invention, which should be judged by the scope defined by the claims appended hereto. For instance, an application for expanding the principle of the above background color selecting means wherein a system for creating text message includes a background scene selecting means which stores a plurality of background scenes in the memory may be a modified embodiment without departing from the scope of the present invention; once a user selects one among a plurality of background scene indexes, outputting the background scene attribute value of the selected background scene(so called, a letter paper concept).

Method for Creating Text Message

A method for creating text message according to the present invention is the method for creating text message including a character and an attribute information by using the aforementioned text message creating system.

Firstly, prior to describing an embodiment of the method for creating text message, a data composition of text message of mobile phone created according to the present invention will be described. The FIG. 4c shows a text message comprising a character string, an identifier and an attribute information and the FIG. 4d shows a text message comprising a character string, an index value of background scene and an attribute information.

Figure 4C:
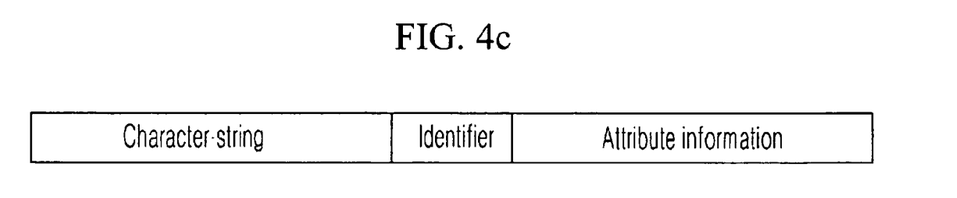
Figure 4D:
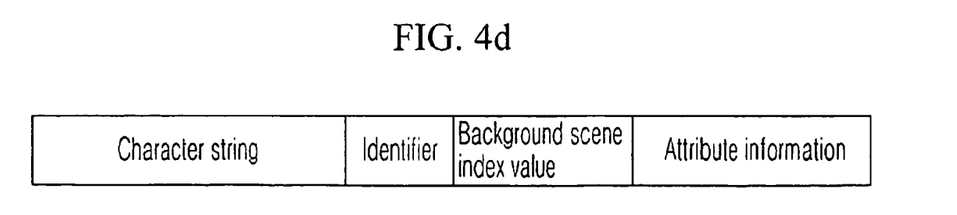

The method for creating text message according to the present invention relates to a method for creating text message as shown in the FIGS. 4c and 4d, wherein the attribute information includes a character color value and a character blink value, and inputting of background scene index may be optionally carried out.

Hereinafter, the method according to the present invention will be described in detail with reference to the FIG. 5.

Firstly, when a user accesses a menu on a mobile phone display to use message service and inputs a text message [21'], character information is formed in accordance with the pre-determined rules for the inputted character string [23'] by the built-in processor.

An identifier representing the start of an attribute information after the end of the above character information is inserted [25'], wherein the identifier refers to a bit informing that attribute information such as character color, character blink and background scene, etc. will follow the character information.

And then, character blink value and character color value [both of the values will be defined as attribute information] are inserted following the identifier [27']. But, these values are selected in the non-printable area among ASCII codes which are not used for a portable phone.

Figure 6A:
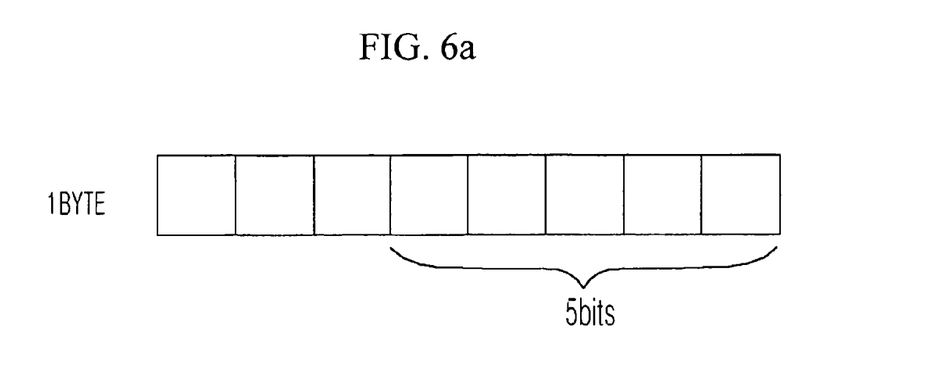
FIG. 6a is a view showing occupied bit per 1 byte of attribute values applied to the method for writing text messages according to the present invention.

As the above attribute information use a non-printable code area in ASCII codes, namely values only from 0x01 to 0x1F, it is possible to use 5 bits of 1 byte(refer to the FIG. 6a). Therefore, according to the present invention, in order to map attribute value in the non-printable code, the upper 3 bits are usually maintained to be binary numeral "0" and the other 5 bits are used for indicating attribute values. Within the above 5 bits, 3 bits are assigned for each attribute value for each character(1 bit for the character blink value and 2 bits for the character color). Accordingly, the character color is possibly selected among $2^2=4$ kinds of colors.

Figure 6B:
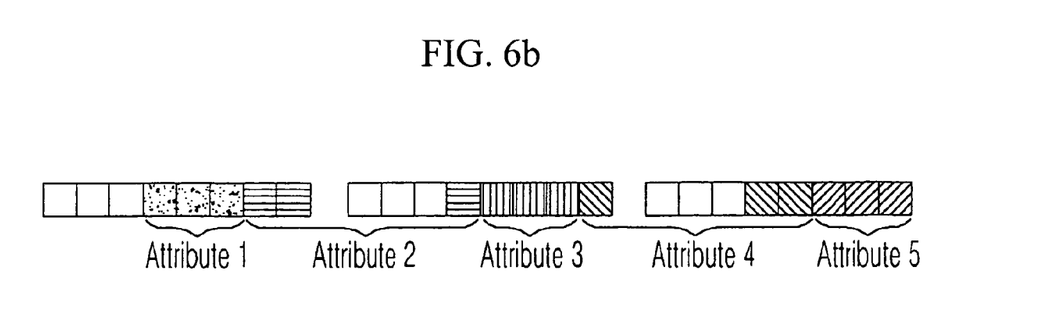
FIG. 6b is a view showing an example according to the method for writing text messages of the present invention wherein 3 bytes of attribute information are assigned.

As the attribute value for each character is 3 bits, attribute values are arranged in the same manner as shown in the FIG. 6b when 5 bits being possible to use in the non-printable code area is fully utilized. That is to say, 3 bits among the rest 5 bits exclusive of the upper 3 bits from 1 byte are arranged for the attribute value. Although 3 bits are assigned to the attribute value in the FIG. 6b, it is not limited thereto and may be modified in accordance with the needs for design by those skilled in art.

Figure 5:
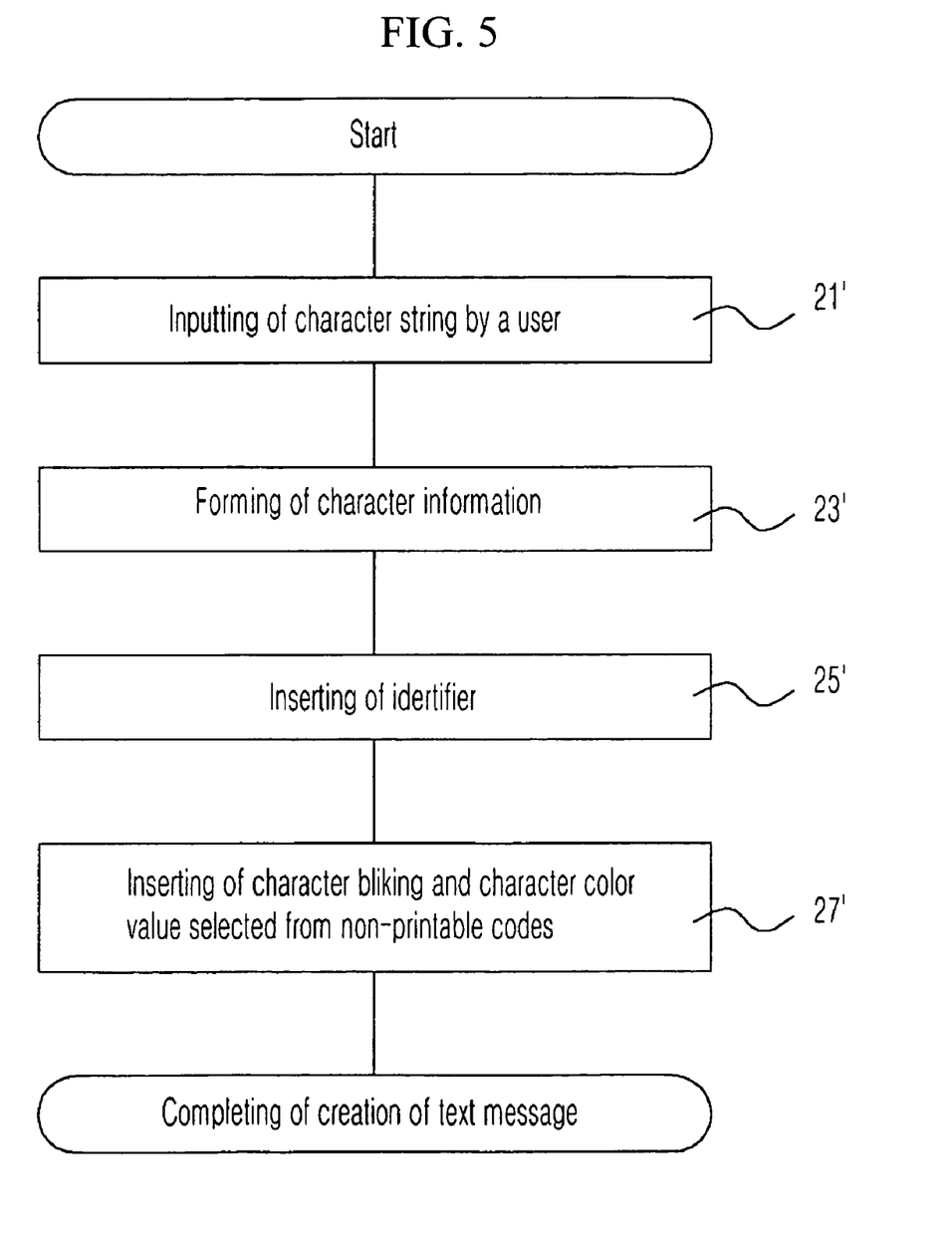
FIG. 5 is a flow chart of a method for writing text messages according to the present invention.

The process in the FIG. 5 may further comprise the step for inserting background scene index values as shown in the text message data format as shown in the FIG. 4. When 2 bytes are used for a background scene value, it is possible to select one among $2^{10}=1024$ background scenes.

As described above, a system and a method for creating text message according to the present invention can provide interesting text message services breaking from the conventional services providing monochrome and prosaic message. They can enhance effects for distributing advertisements and notices, etc. by effectively using the functions of character colors, background colors and blink. Further, as they include attribute information by using non-printable codes which are not adopted in the mobile phones, it is compatible with the conventional text message service.

The invention claimed is:

1. A system for creating text message on mobile phone display wherein attribute information (character colors, background colors and blink) is added to the message, comprising:
   a means for creating a first message signal by combining character codes which are outputted from a character input means by a user and then inputted thereinto;
   a means for selecting a character color to output the corresponding character color attribute value selected among a plurality of color values by the user;
   a means for selecting a background color to output the corresponding background attribute value selected among a plurality of color values by the user;
   a means for storing a plurality of blink modes and selecting a blink mode to output the corresponding blink attribute value selected among the plurality of blink modes by the user;
   a means for creating a second message signal by combining each of the attribute values outputted from the selecting means for character color, background color and blink function; and
   a means for transmitting the first and the second message signals.

2. The system for creating text message on mobile phone display according to claim 1, wherein the first message signal comprises a header part including ID or specific number and a message data part comprising ASCII values, and the second message signal comprises a header part including ID or specific number and an attribute information part of character color, background color and blink.

3. The system for creating text message on mobile phone display according to claim 1, characterized in that the means for selecting character colors and background colors include scroll buttons on a side of the phone.

4. The system for creating text message on mobile phone display according to claim 1, characterized in that the means for selecting blink mode includes left-right shifting button on the keypad of the phone.

5. The system for creating text message on mobile phone display according to claim 1, wherein the first and second messages are included in one message signal.

6. The system for creating text message on mobile phone display according to claim 1, wherein the transmitting means transmit the second message signal to be followed by the first message signal.

7. The system for creating text message on mobile phone display according to claim 1, wherein the transmitting means transmit the first and second message signals at the same time.

8. The system for creating text message on mobile phone display according to claim 1, wherein the background color selecting means includes a background scene selecting means which allows a user to select one among a plurality of background scene indexes stored in a memory thereby outputting a background scene attribute value for the selected background scene.

9. A system for creating text message on mobile phone display, wherein
   attribute information (character colors, background colors and blink) is added to the message, comprising:
   a means for creating a first message signal by combining character codes which are outputted from a character input means by a user and then inputted thereinto;
   a means for selecting a character color to output the corresponding character color attribute value selected among a plurality of color values by the user;
   a means for selecting a blink mode to output the corresponding blink attribute value selected among a plurality of blink modes by the user;
   a means for creating a second message signal by combining each of the attribute values outputted from the selecting means for character color, background color and blink function;
   a means for transmitting the first and the second message signals; and
   the blink modes comprise a non-blink mode, a mode for blinking in an odd number of the characters and a mode for blinking in an even number of the letters characters.

* * * * *